US007956101B2

(12) United States Patent
Grossman

(10) Patent No.: US 7,956,101 B2
(45) Date of Patent: *Jun. 7, 2011

(54) ANAEROBICALLY COMPOSTABLE POLYMERIC COMPOSITIONS, ARTICLES AND LANDFILL BIODEGRADATION

(75) Inventor: Richard F. Grossman, Wilmington, DE (US)

(73) Assignee: Biotech Products, LLC, Randolph, NJ (US)

( * ) Notice: Subject to any disclaimer, the term of this patent is extended or adjusted under 35 U.S.C. 154(b) by 11 days.

This patent is subject to a terminal disclaimer.

(21) Appl. No.: 12/500,805

(22) Filed: Jul. 10, 2009

(65) Prior Publication Data

US 2009/0275111 A1    Nov. 5, 2009

Related U.S. Application Data

(63) Continuation-in-part of application No. 11/747,481, filed on May 11, 2007, which is a continuation-in-part of application No. 11/041,322, filed on Jan. 24, 2005, now Pat. No. 7,390,841, application No. 12/500,805, which is a continuation-in-part of application No. 12/049,668, filed on Mar. 17, 2008, and a continuation-in-part of application No. 12/098,613, filed on Apr. 7, 2008.

(51) Int. Cl.
| | |
|---|---|
| *A61K 9/16* | (2006.01) |
| *B03D 1/016* | (2006.01) |
| *B09B 5/00* | (2006.01) |
| *B29C 33/60* | (2006.01) |
| *B32B 3/00* | (2006.01) |
| *B32B 3/10* | (2006.01) |
| *B32B 5/00* | (2006.01) |
| *B32B 5/02* | (2006.01) |
| *B32B 7/00* | (2006.01) |
| *B32B 9/04* | (2006.01) |
| *B32B 19/00* | (2006.01) |
| *B32B 27/02* | (2006.01) |
| *B32B 27/04* | (2006.01) |
| *B32B 27/12* | (2006.01) |
| *B32B 27/30* | (2006.01) |
| *B60C 1/00* | (2006.01) |
| *B60K 15/04* | (2006.01) |
| *C04B 24/26* | (2006.01) |
| *C07F 7/00* | (2006.01) |
| *C07F 7/18* | (2006.01) |
| *C08F 214/06* | (2006.01) |
| *C08G 18/28* | (2006.01) |
| *C08G 18/77* | (2006.01) |
| *C08J 3/00* | (2006.01) |
| *C08K 5/00* | (2006.01) |
| *C08K 5/49* | (2006.01) |
| *C08K 5/56* | (2006.01) |
| *C08K 5/51* | (2006.01) |
| *C08L 27/00* | (2006.01) |
| *C08L 31/02* | (2006.01) |
| *C08L 55/00* | (2006.01) |
| *D02G 3/00* | (2006.01) |
| *D06N 7/00* | (2006.01) |
| *D06P 1/52* | (2006.01) |
| *F16J 15/20* | (2006.01) |

(52) U.S. Cl. ............... 523/124; 405/129.95; 428/98; 428/137; 428/147; 428/190; 428/357; 428/365; 442/43; 442/58; 442/155; 442/164; 523/126; 524/115; 524/136; 524/176; 524/210; 524/218; 524/225; 524/563; 524/543; 524/570; 524/551; 524/565; 524/567

(58) Field of Classification Search .................. 428/98, 428/137, 147, 190, 357, 365; 442/155, 164, 442/43, 58; 523/124, 126; 524/176, 115, 524/136, 210, 218, 225, 563, 543, 551, 565, 524/567, 570; 405/129.95
See application file for complete search history.

(56) References Cited

U.S. PATENT DOCUMENTS

| | | |
|---|---|---|
| 2,641,588 A | 6/1953 | Leistner et al. |
| 2,641,596 A | 6/1953 | Leistner et al. |
| 2,648,650 A | 8/1953 | Weinberg et al. |
| 2,726,227 A | 12/1955 | Leistner et al. |
| 2,726,254 A | 12/1955 | Leistner et al. |
| 2,801,258 A | 7/1957 | Johnson |
| 2,870,119 A | 1/1959 | Leistner et al. |
| 2,870,182 A | 1/1959 | Leistner et al. |
| 2,872,468 A | 2/1959 | Leistner et al. |
| 2,883,363 A | 4/1959 | Leistner et al. |
| 2,891,922 A | 6/1959 | Johnson |
| 2,914,506 A | 11/1959 | Mack et al. |
| 2,954,363 A | 9/1960 | Kuehne et at |
| 3,021,302 A | 2/1962 | Frey et at |

(Continued)

FOREIGN PATENT DOCUMENTS

DE          10157420          6/2003

(Continued)

OTHER PUBLICATIONS

English Abstract of DE 10157420, Nada et al., Jun. 2003.* PCT Search Report and Written Opinion for PCT-US2010/039005, dated Sep. 2, 2010.
A.V. Yabannavar et al., Methods for Assessment of Biodegradability of Plastic Films in Soil, Applied and Environmental Microbiology, vol. 60, No. 9, Oct. 1994, p. 3608-3614.
T. M. Phillips et al., Biodegradation of Hexachlorocyclohexane (HCH) by Microorganisms, Biodegradation 16: 363-392 (2005).

(Continued)

*Primary Examiner* — Patrick D Niland
(74) *Attorney, Agent, or Firm* — Wood, Herron & Evans, LLP

(57) ABSTRACT

Compostable hydrocarbon polymers, composites, and articles anaerobically biodegrade in landfills in a relatively short time. Composite polymeric articles and sheets such as indoor or outdoor signs, billboards, banners, images, protective barriers, backdrops and wall coverings have very useful service durations and yet are landfill biodegradable.

30 Claims, No Drawings

U.S. PATENT DOCUMENTS

| | | | |
|---|---|---|---|
| 3,413,264 A | 11/1968 | Hechenbleiker et al. |
| 3,424,712 A | 1/1969 | Gottlieb et al. |
| 3,424,717 A | 1/1969 | Gottlieb et al. |
| 4,069,192 A | 1/1978 | Monte et al. |
| 4,080,353 A | 3/1978 | Monte et al. |
| 4,087,402 A | 5/1978 | Monte et al. |
| 4,094,853 A | 6/1978 | Monte et al. |
| 4,096,110 A | 6/1978 | Monte et al. |
| 4,098,758 A | 7/1978 | Monte et al. |
| 4,101,810 A | 7/1978 | Schermerhorn et al. |
| 4,122,062 A | 10/1978 | Monte |
| 4,152,311 A | 5/1979 | Monte et al. |
| 4,192,792 A | 3/1980 | Sugerman et al. |
| 4,261,913 A | 4/1981 | Monte et al. |
| 4,277,415 A | 7/1981 | Sugerman et al. |
| 4,338,220 A | 7/1982 | Sugerman et al. |
| 4,417,009 A | 11/1983 | Sugerman et al. |
| 5,514,734 A | 5/1996 | Maxfield et al. |

FOREIGN PATENT DOCUMENTS

| | | |
|---|---|---|
| GB | A-1 423 657 | 2/1976 |
| GB | A-1 488 620 | 10/1977 |

OTHER PUBLICATIONS

Y. Otake et al., Biodegradation of Low-Density Polyethylene, Polyvinyl Chloride, and Urea Formaldehyde Resin Buried Under Soil for Over 32 Years. J. Applied Polymer Science, vol. 56, 1789-1796 (1995).

I. Mersiowsky, Fate of PVC Polymer, Plasticizers, and Stabilizers in Landfilled Waste, J. Vinyl & Additive Technology, vol. 8, No. 1, Mar. 2002.

Leonard I. Nass and Charles A. Heiberger, Encyclopedia of PVC, vol. 2, p. 47, Marcel Dekker, Inc., New York.

Ha, K R et al, "Polycarpolactone Polyvinyl Chloride Polymer Mixture Biodegradable Film Sheet", Abstract Only, Database WPI Section Ch. Week 200348 Derwent Publications Ltd., London, GB; Class A14, AN2003-511077XP002353301 and KR 2003 019 726 A (HA K R) Mar. 7, 2003.

* cited by examiner

ANAEROBICALLY COMPOSTABLE POLYMERIC COMPOSITIONS, ARTICLES AND LANDFILL BIODEGRADATION

RELATED APPLICATIONS

This application is a continuation-in-part application of U.S. patent application Ser. No. 11/747,481, filed May 11, 2007, which in turn is a continuation-in-part of U.S. patent application Ser. No. 11/041,322, filed Jan. 24, 2005, now U.S. Pat. No. 7,390,841, U.S. patent application Ser. No. 12/049,668, filed Mar. 17, 2008 and U.S. patent application Ser. No. 12/098,613 filed Apr. 7, 2008, and the entire description and claims of these applications are incorporated herein by reference.

FIELD OF THE INVENTION

This invention relates to anaerobically compostable polymeric compositions and articles having indoor and outdoor utilities with effective anaerobic landfill degradation. Articles of the polymer compositions are also made into composites having an hydrophobic polymer surface layer and an underlying hydrolyzable biodegradable polymer layer which biodegrade in landfills in a relatively short time.

BACKGROUND OF THE INVENTION

For many years it has been desired to make plastic materials from polymers such as polyvinyl chloride (PVC), polyvinyl acetate (PVAc), and olefin polymers (EPDM) which are either biodegradable by microorganisms or environmentally degradable such as in a landfill. In spite of considerable efforts, landfills are becoming inundated with plastic materials, and articles made therefrom, that will not degrade perhaps for centuries. This is especially true for vinyl halide and olefin polymer materials such as PVC and EPDM that are considered non-biodegradable, that is, they persist in landfills under anaerobic conditions indefinitely without noticeable decomposition. This factor limits the acceptance of PVC and polyolefins in many products where their useful balance of properties and low cost would be attractive. An example is that of printable film and sheet. If a sample of EPDM or flexible (plasticized) PVC is tested per ASTM D 5526, Standard Test Method for Determining Anaerobic Biodegradation of Plastic Materials Under Accelerated Landfill Conditions, there is no appreciable weight loss or change in appearance after 100 days at 97° F. in contact with simulated household waste. In contrast, cellulosic polymers and other biodegradable plastics, such as polylactic acid and polycaprolactone, are completely consumed.

There has been a particular need for a compostable hydrocarbon polymer composition for use in many end products such as polyvinyl chloride, polyvinyl acetate or olefin polymer films, banners, billboards, signs, laminates, ink jet media, diapers, hygienic pads and the like. These products must satisfy properties for practical purposes such as tear strength, tensile and impact strengths to function in many useful articles. However, the same properties that make them useful lead to their lack of biodegradability. PVC, PVAc and olefin polymers have achieved widespread usage. However, the explosive growth of such thermoplastics or elastomers has aggravated the problem of disposing of them, and has caused their accumulation in landfills. Very little of these polymeric waste products degrade in most landfills because of anaerobic conditions. The problem has become aggravated because of the shortage of landfills and municipalities are seeking to restrict the use of plastics because of their inability to degrade in landfills.

It would be highly desirable to provide compostable plastic articles that are capable of withstanding environmental conditions that make such articles useful and prevent their degradation by sunlight, moisture, temperature, and the like during their service life. The useful plastic products for practical purposes must satisfy such properties as water impermeability and sufficient mechanical properties, such as tear, tensile and impact strengths to function in useful articles. For example, there is a particular need for indoor or outdoor signs, billboards, banners, images, protective barriers, backdrops, and building wall coverings to provide plastic sheet material which will withstand outdoor environmental conditions. In the case of disposable health care products, diapers, underpants, hygienic pads, and the like, these products must also satisfy such properties as water impermeability in order to prevent seepage of urine or other human waste products therethrough. Further, for health care and waste management, there are needs for disposable plastic products such as medical tubing, bags and utensils that are biodegradable.

SUMMARY OF THE INVENTION

This invention is directed to anaerobically compostable polymeric compositions and articles, such as a composite polymeric sheet. The compostable articles are typically hydrophobic due to the hydrocarbon polymers employed in their manufacture. In view of the hydrophobic nature of the polymers employed, the articles are well-suited for environmental use by withstanding conditions such as sunlight, moisture, humidity, and the like. They are therefore very adaptable for fabricating useful articles that can withstand environmental or use conditions. However, the polymeric compositions and articles are anaerobically compostable, because the hydrocarbon polymer employed contains an organotitanate or an organozirconate as an anaerobic prodegradant, in relative amounts to render the polymer compostable in a landfill. Where polymer composites are made, the surface layer can be hydrophobic and the underlying layer can be a hydrolyzable biodegradable polymer which enables the entire article to be compostable in the landfill.

More particularly, a suitable polymeric composition or article contains an hydrocarbon polymer which may be a thermoplastic or elastomeric polymer. The term "hydrocarbon polymer" as used herein and understood in the art is intended to cover organic polymers consisting of long chains of carbon atoms and includes the addition of other atoms or group of atoms into the polymer chain of carbon atoms, such as polyvinyl chloride (PVC) and polyvinyl acetate (PVA). Hydrocarbon polymers are selected from the group consisting of a vinyl halide polymer, a vinyl acetate polymer, an olefin polymer, and copolymers or blends thereof. Composite articles of these hydrocarbon polymers containing anaerobic prodegradants with normally biodegradable polymer structures can be made according to this invention. In the case of the biodegradable thermoplastic polymer, suitable polymers include polylactic acid (PLA), polyvinyl alcohol polycaprolactone (PCL), polyamide, polyacrylamide, polyacrylate, polymethacrylate, polyester, and cellulose, and copolymers or blends thereof.

This invention is also directed to a method of anaerobic biodegradation of polymeric articles in a landfill. The method is practiced by introducing an article or a physically reduced form thereof into a landfill for anaerobic degradation. The article is comprised of an hydrophobic hydrocarbon polymer containing an organotitanate or an organozirconate as a prodegradant in relative amounts to render the article anaerobically compostable. In the case of composite articles, for example, a polymeric surface layer contains the prodegradant, and underlying the hydrophobic surface layer can contain an hydrolyzable biodegradable thermoplastic polymer layer. Each layer is thus compostable or biodegradable in the landfill. Moreover, the useful articles or composite articles having the hydrophobic hydrocarbon polymer composition or surface layer enable environmental servicing utilities and, when introduced into a landfill, are anaerobically compostable.

DETAILED DESCRIPTION OF THE INVENTION

As reported in the above-identified Ser. No. 11/041,322 patent application, polyvinyl chloride compositions have been formulated with plasticizer and stabilizer along with the prodegradant composition. Polymeric sheets containing this composition and composites with woven or nonwoven sheets have been made compostable. Such compositions consist of (a) PVC; (b) a plasticizer selected from the group of completely aliphatic carboxylic acid esters; (c) a heat stabilizer selected from the group of sulfur-free dialkyl and monoalkyltin carboxylates; and (d) an anaerobically prodegradant reactive organotitanate or organozirconate. As reported in the above-identified Ser. No. 11/747,481 patent application, further unobvious and unexpected improvements have been made. In particular, compositions of vinyl halide resins such as PVC, even without plasticizer, are compostable when the prodegradant system is employed. In addition, it has also been found that the reactive organotitanate or organozirconate can be broadened to include other monomeric adducts in addition to the amide adduct disclosed in the above-identified Ser. No. 11/041,322 patent application. For instance, an ester adduct of the organotitanate or organozirconate and an organotin compound, in relative amounts, has been found to render the vinyl halide polymer composition compostable, even in the absence of a plasticizer. The above-identified application Ser. Nos. 12/098,613 and 12/049,668 are directed to further improvements in compositions, articles, and composites for other polymer systems, such as an olefin polymer and a vinyl acetate polymer.

This application is directed to further improvements in anaerobically compostable polymeric compositions and articles which anaerobically degrade in landfills. Compostable hydrocarbon polymer compositions or articles having very useful hydrophobic surfaces or layers comprise, for example, an olefin polymer and a monomeric adduct of an organotitanate, or organozirconate, as a prodegradant in relative amounts to render the olefin polymer composition compostable. The hydrocarbon polymer can include other atoms or group of atoms polymers as stated above. As employed herein, the term "adduct" is intended to mean a complex association of the monomeric molecule and the organotitanate or organozirconate molecule. It was previously reported that amide salts of the neoalkoxy modified monoalkoxy titanate or zirconate achieved the objectives of the invention. The amide salts were defined particularly by methacrylamide as the monomeric adduct of the reactive titanate or zirconate. It has also been found that the ester adducts of the specific organotitanates or zirconates can also function in the prodegradant of this invention. The monomeric ester of the organotitanate or organozirconate adduct is exemplified by dimethylaminoethyl methacrylate. It has also been found that the dimethylaminopropyl acrylamide is as effective as the methacrylamide.

The compositions and composites of this invention, as well as useful articles made therefrom, are compostable. "Compostable" means that the composition or sheet undergoes chemical, physical, thermal and/or biological degradation such that it may be incorporated into and is physically indistinguishable from finished compost (humus) and which ultimately mineralizes (biodegrades) to $CO_2$, water and biomass in the environment like other known compostable matter such as paper and yard waste. The compostable films and composites are anaerobically biodegradable. "Biodegradable" means that the composition or composite is susceptible to being assimilated by anaerobic microorganisms when buried in the ground, e.g., a landfill under conditions conducive to their growth. For purposes of this invention, "compostable" is intended to mean anaerobically biodegradable by microorganisms.

Anaerobic composting conditions that enable the chemical, physical, thermal and/or biological degradation of the composition or composite may vary. The compositions, articles or composites of this invention are especially adapted to be compostable in municipal solid waste composting facilities or landfills. For example, following ASTM D 5526-94 (reapproved 2002), Standard Test Method for Determining Anaerobic Biodegradation of Plastic Materials Under Accelerated Landfill Conditions, samples of PCV, PVAC and EPDM were degraded, incorporated into and physically indistinguishable in the test landfill.

Compostable polymer compositions, articles, and composites of this invention, their method of manufacture and compostability will be understood with reference to the following detailed description. The hydrophobic hydrocarbon polymer in the article or article surface layer is broadly defined herein as a polymer which includes thermoplastic or elastomeric polymers. More preferably, it includes an olefin polymer, a vinyl halide polymer, a vinyl acetate polymer and copolymers and blends thereof as follows.

Hydrocarbon Polymers and Composites

A. Olefin Polymer

The olefin polymer employed is most commonly a homopolymer, copolymer, or terpolymer of monomers such as ethylene, propylene or a diene. The principles of this invention are applicable to polymers of unsaturated hydrocarbons containing one or more pairs of carbon atoms linked by a double bond. While this invention has been illustrated with specific olefin polymers in the operating examples which follow, it is to be understood that this invention is not limited to the specific examples. The olefin monomers that may be polymerized alone or in admixture with other ethylenically unsaturated monomers include, e.g., ethylene; propylene; 1-butene; isobutene; 1-pentene; vinyl benzenes and naphthalenes such as styrene or vinyl naphthalene; and dienes such as butadiene, isoprene, cyclopentadiene, and ethylidene norbornene (ENB). Copolymers of such monomers include acrylonitrile-butadiene-styrene (ABS) and styrene-acrylonitrile (SAN). Suitable elastomeric polymers may also be biodegradable. Suitable elastomeric polymers include terpolymers of ethylene, propylene, and a diene, such as ENB (EPDM). Other elastomers include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ethylene-propylene-diene), and ethylene-propylene. A new class of rubber-like polymers may also be employed and they are generally referred to as polyolefins produced from single-site or metallocene catalysts whereby ethylene, propylene, styrene and other olefins may be polymerized with butene, hexene, octene, etc., to provide elastomers suitable for use in accordance with the principles of this invention, such as poly(ethylene-butene), poly(ethylene-hexene), poly(ethylene-octene), poly(ethylene-propylene) and/or polyolefin terpolymers thereof.

B. Vinyl Halide Polymer

The vinyl halide resin employed is most commonly a homopolymer of vinyl chloride, i.e., polyvinyl chloride. It is to be understood, however, that this invention is not limited to a particular vinyl halide resin such as polyvinyl chloride (PVC) or its copolymers. Other halogen-containing polymers or resins which are employed and which illustrate the principles of this invention include chlorinated polyethylene, chlorosulfonated polyethylene, chlorinated polyvinyl chloride, and other vinyl halide polymer or resin types. Vinyl halide polymer or resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, acrylates, styrene, etc. A simple case is the conversion of vinyl chloride $H_2C=CHCl$ to polyvinyl chloride ($CH_2CHCl$-)n wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinate polyethylene, and the like. Of course, the vinyl halide commonly used in the industry is the chloride, although others such as bromide and fluoride may be used. Examples of the latter polymers include polyvinyl bromide, polyvinyl fluoride, and copolymers thereof.

C. Vinyl Acetate Polymer

The vinyl acetate polymer employed is most commonly a homopolymer of vinyl acetate, i.e., polyvinyl acetate. Copolymers of vinyl acetate are also suitably employed. It is to be understood, however, that this invention is not limited to polyvinyl acetate or its copolymers. Other vinyl acetate based polymers which are employed and which illustrate the principles of this invention include partially hydrolyzed polyvinyl acetate, e.g. polyvinyl alcohol, ethylene-vinyl acetate, vinyl chloride-vinyl acetate copolymer or other copolymer types. Vinyl acetate based polymer, as understood herein, and as appreciated in the art, is a common term and is adopted to define those polymers usually derived by polymerization or copolymerization of vinyl acetate monomer with or without other comonomers such as ethylene, propylene, vinyl chloride, vinyl ethers, vinylidene chloride, methacrylate, acrylates, styrene, etc. A simple case is the conversion of vinyl acetate to polyvinyl acetate wherein the ether oxygen of the ester group is bonded to the carbon atoms of the carbon chain of the polymer.

D. Composites with Biodegradable Polymers

As stated above, composites of hydrocarbon polymers and normally biodegradable polymers can be made according to of this invention. Such normally biodegradable polymers include polylactic acid (PLA), polyvinyl alcohol (PVA), polycaprolactone (PCL), polyamide, polyacrylamide, polyacrylate, polymethacrylate, polyester, and cellulose, and copolymers or blends thereof. Other examples of biodegradable polymers suitable for use are those which enable the manufacture of useful articles or composites such as sheet materials. These articles are formed in a number of ways such as by extrusion molding, coextrusion of a surface layer and underlying layer into a composite sheet, for example. The sheets may also be made by lamination of the layers, combined coextrusion-lamination techniques or coating techniques.

Anaerobic Prodegradant Organotitanate or Organozirconate

As disclosed in the above identified application Ser. No. 11/041,322, the anaerobic prodegradant of this invention is an organozirconate or organotitanate. The monomeric adducts of the organozirconate or titanate are exemplified by the monomeric groups of dimethylaminopropyl acrylamide, methacrylamide, dimethylaminoethyl methacrylate, and other similar reactive monomeric groups as detailed herein. In a broader sense, the adducts more preferably comprise dialkylamino-short alkylchain-reactive monomers. The prodegradant may be defined more particularly as follows.

The chemical description and chemical structure of organotitanates or zirconates have been well developed. Kenrich Petrochemicals, Inc. is a manufacturer of these products and, hereinafter, the Kenrich products are interchangeably identified with the prefix "Kenrich", "K", "KR", and "LICA". For instance, Kenrich LICA 38J is a reactive titanate under the chemical name titanium IV neoalkanolato tri(dioctyl)pyrophosphate-O (adduct) N-substituted methacrylamide. Furthermore, with zirconium substituted for titanium, Kenrich produces NZ 38 under the chemical description zirconium IV neoalkanolato tri(dioctyl)pyrophosphate-O (adduct) N-substituted methacrylamide. These compounds are generally referred to as amide salts of neoalkoxy modified monoalkoxy titanate or zirconate. While the invention has been exemplified hereinafter with these amide adducts of these specific organotitanates or organozirconates and other prodegradants, it is to be understood that other similar compounds can achieve the objectives of this invention.

The K38J pyrophosphato titanium adduct is the reaction product of K38+dimethylaminopropyl methacrylamide (DMPDMA), according to the following structure where R'=methyl, R"=propyl, R=butyl, n~3.

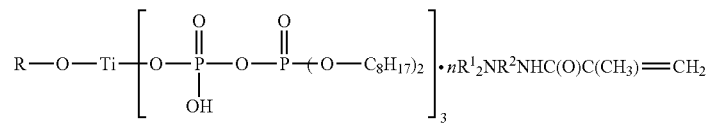

K38=the above structure without DMPDMA. K38 is titanium IV neoalkanolato tri(dioctyl)pyrophosphate-O. These two ingredients react rapidly at room temperature when mixed in stoichiometric proportions (close to 3:1). P—OH becomes P—O⁻ and R2N, R3N+. A bright red color develops, which is the thermochromic, indicating coordination of likely C=O to titanium, which displays such colors when penta-coordinate instead of tetra-coordinate. (For example, acetone.TiCl4 is orange-red, and the precursors, colorless.) Neither K38 nor DMPDMA cause depolymerization of olefin polymers when used alone. However, if added separately to the olefin polymer, the combination in situ is as effective as K38J. Thus, use of the term "adduct" is intended to cover the use of preformed complex or the separate addition of the components to enable their association or complexing in situ to provide the prodegradant effects of this invention.

A substituted methacrylamide can also be employed as an adduct of the organotitanate or zirconate. For instance, Kenrich Ken-React KR-238J is another reactive titanate where the monomeric adduct is a substituted methacrylamide. The KR-238J is a dimethylaminopropyl methacrylamide which has been found to be as effective as the methacrylamide adduct of Kenrich-38J, described above. A chemical description of KR-238J is titanium IV ethylenedialato bis(dioctyl) pyrophosphato ethylene titanate (adduct) N-substituted methacrylamide. Furthermore, dimethylaminoethyl methacrylate, a monomeric ester adduct, is equally effective in combination with the pyrophosphato form of the titanium or zirconium coupling agent. The K238J adduct has the chemical structure as follows:

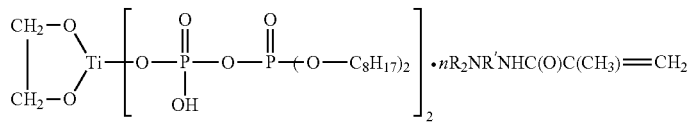

K238=the above structure without DMPDMA. Thus, as used herein "K38" and "K238" are intended to mean the organopyrophosphato titanate portion of the adduct which is complexed with the monomeric amide, ester, or other like monomers, and the resulting adduct is referred to herein as K38J and K238J, respectively. Specific compounds are exemplified by titanium IV neoalkanolato tri(dioctyl)pyrophosphato-O (adduct) N-substituted methacrylamide and zirconium IV neoalkanolato tri(dioctyl)pyrophosphato-O (adduct) N-substituted methacrylamide, titanium IV neoalkanolato bis(dioctyl)pyrophosphato-O (adduct) N,N-dimethylaminoalkyl propenoamide, and zirconium IV neoalkanolato bis(dioctyl)pyrophosphato-O (adduct) N,N-dimethylaminoalkyl propenoamide.

The above monomeric adducts result from salt or complex formation via the titanate/zirconate acidic —P=O(OH) group. The monomer contains a basic functional group that will react to form a salt (but not go on to other reactions such as oxidation). A tertiary amine group is favorable. This could be a dialkyl amine group, methylpyridine functionality or a range of basic nitrogen heterocyclic groups. The rest of the reactive momomer must contain an activated carbon-carbon double bond. The C=C bond, to be activated, should be conjugated with C=O, as in an ester, ketone, aldehyde or amide, with —CN, with oxygen as in a vinyl ether, or with oxygen, nitrogen or sulfur in an allylic linkage, or with an aromatic ring as in styrene or vinyl ferrocene.

In a more generalized form as set forth the above identified application Ser. No. 11/747,481, the adducts can be defined as:

ORGANOTITANATE OR ZIRCONATE-P=O(OH)-SALT FORMING GROUP-R—C=C-ACTIVATING GROUP, where R is a hydrocarbon radical or substituted hydrocarbon radical and the activating group is conjugated with the C=C.

It has been found that a nitrate or sulfonate group, e.g. "X" may be substituted for the phosphate group and the results of this invention may be achieved. Thus the adducts may be defined as:

ORGANOTITANATE OR ZIRCONATE-X-SALT FORMING GROUP-R—C=C-ACTIVATING GROUP

Other monomers of the adducts of this invention are exemplified by the following:

ethyl dimethylaminoethylmethacrylate

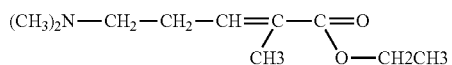

methyl dimethylaminopropyl acrylate $(CH_3)_2N-CH_2-CH_2-CH_2-CH=CH-C(=O)OCH_3$ 2-morpholine-N-ethyl acrylamide

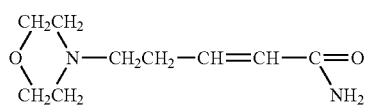

2-piperidinyl-N-ethyl acrylonitrile $\begin{array}{c} CH_2CH_2 \\ CH_2 \quad N-CH_2CH_2-CH=CH-CN \\ CH_2CH_2 \end{array}$ 2-dimethylaminoethyl acrolein
 $(CH_3)_2N-CH_2CH_2-CH=CH-CH=O$
dimethylaminoethyl vinyl ether
 $(CH_3)_2N-CH_2CH_2-O-CH=CH_2$
dimethylaminoethyl vinyl thioether
 $(CH_3)_2N-CH_2CH_2-S-CH=CH_2$ 4-dimethylaminomethyl styrene

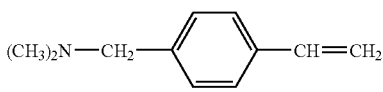

allyl 3-dimethylamino propionate

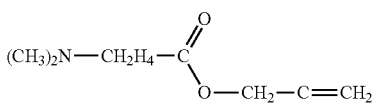

methallyl 3-dimethylamino propionate

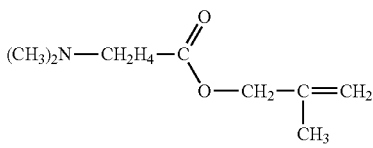

thioallyl 3-dimethylamino propionate

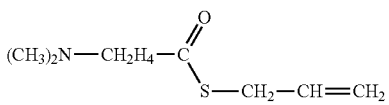

dimethylaminomethyl acrylate (reverse ester), also corresponding reverse amides

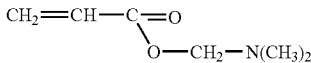

N-methyl-N-dimethylaminomethyl acrylamide

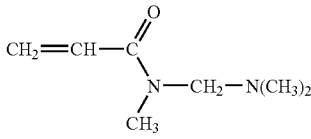

These organotitanates or zirconates are further described in considerable detail in the following US patents which are incorporated herein in their entireties by reference, namely, U.S. Pat. Nos. 4,069,192; 4,080,353; 4,087,402; 4,094,853; 4,096,110; 4,098,758; 4,122,062; 4,152,311; 4,192,792; 4,202,810; 4,261,913; 4,277,415; 4,338,220; 4,417,009; 4,512,928; 4,600,789; 4,623,738.

The above-identified patents have been granted to Monte et al., and assigned to Kenrich Petrochemicals, Inc. The patents are directed to coupling agents and conform to the following general formula:

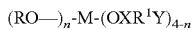

The M group in the above general formula is representative of titanium or zirconium. The coupling agents disclosed in the above-identified patents are generally referred to in the art as organotitanates or organozirconates. For example, the functions of the groups in the above general formula for the above titanates or zirconates have been described in the above patents and a paper entitled, "Neoalkoxy Titanate and Zirconate Coupling Agent Additives in Thermoplastics", Monte, S. J., Kenrich Petrochemicals, Inc., Polymers and Polymeric Composites (2002), 10 (II), 121-172. In addition, reference may be made to Handbook of Polymer Additives and Modifiers, Chapter 75: by Grossman, R. F., Coupling Agents; pp. 993-1000 (Van Nostrand 1992). The literature, as represented by these publications, has disclosed the merits of using organotitanates or organozirconates in polymer compositions to essentially increase the stability of the polymeric compositions, especially those compositions containing fillers or reinforcing agents, to provide an overall better balance of processing and properties in the manufacture of useful polymeric articles. However, in accordance with the principles of this invention, it has been found that useful hydrocarbon polymer compositions may be rendered anaerobically biodegradable in landfills by employing certain monomeric forms of organotitanates or zirconates as anaerobic prodegradants.

Accordingly, the following modified general formula is proposed to explain the anaerobic prodegradants functions as used according to the principles of this invention:

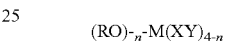

With an RO-M bond, M is a metal capable of forming a bond to an aliphatic carbon atom that has sufficient stability to permit addition to a polymeric composition and subsequent processing. In addition, the RO-M bond must not add toxicity and M is titanium or zirconium. The metal must also be able to expand its octet, that is, to form addition complexes with greater than tetrahedral coordination, and is involved in mediating carbon-carbon bond scission. The RO-group is designed to provide mobility in a polymer matrix.

In this invention, it has been found that groups, such as "X", can be placed on M that attract microbes, the latter being taken to designate bacteria, archaea, cyanobacteria, unicellular or cell cluster algae and fungi. These microbes require a hydrophilic site, such as provided by certain of the organotitanates and zirconates disclosed in the Kenrich references. The "Y" group provides the monomeric adduct which complexes or forms a salt with the X group of the organotitanate or zirconate as expressed in the more generalized formula above. The X groups found effective in attracting microbes include phosphate, nitrate and sulfonate. These ligands have provided other benefits, per the above Kenrich patents, but have never previously been shown to promote anaerobic landfill degradation. It is hypothesized that these oxygenated anions enable oxidation of hydrocarbon polymers by microbes anaerobically in landfills according to this invention. If the microbe-attracting group is designated ~, then the general formula is $(RO)_n\text{-}M(X^\sim Y)_{4-n}$.

The microbe-attracting groups $X^\sim$ may be ligands on M or functional groups on RO. The microbe-attracting ligand (~) itself, in some cases, may have specific affinity for the polymer. Whatever the mechanism or theory, monomeric adducts of organotitanates or zirconates have not been employed as anaerobic prodegradants in useful hydrophobic hydrocarbon polymer composition, articles and landfill degradation.

Prodegradant Synergistic Composition

As earlier reported in application Ser. No. 11/747,481, it has been discovered that the prodegradant behavior of organotitanate or organozirconate adduct, i.e., the organopyrophosphato monomeric adduct, displays an unpredicted synergism in the compostability of vinyl halide, vinyl acetate and olefin polymers which are employed in an article or the composite article surface layer. Further improvements have been made as reported hereinafter for the prodegradants and polymers. The remarkable anaerobic compostability properties exist over ranges of ratios of the essential components. The exact mechanism for the unexpected results and the compostability of polymers with the prodegradants is not completely understood. Certainly there are theories which could be proposed, but regardless of theories, the beneficial results evident in the numerous examples of this invention which follow, in further view of this detailed description, speak for themselves. Applicant relies upon these empirical demonstrations of the principles of this invention to advance its merit.

With the prodegradant of this invention, it has been found that the total composition of prodegradant is useful over a range of about 1 to about 10 parts (phr) by weight based upon 100 parts by weight of the hydrocarbon polymer. The most useful range of total parts by weight of the organotitanate or zirconate in the total composition is on the order of about 1 to about 5 phr.

The principles of this invention and its operating parameters will be further understood with reference to the following detailed examples which serve to illustrate the types of specific prodegradants and their amounts as used in typical polymer formulations and the compostabilities displayed by the prodegradant of this invention. These examples are considered to be exemplary of this invention and should not be considered as limiting, especially in view of applicant's broad disclosure of the principles of this invention.

The compostability of the hydrophobic polymer compositions of Examples 1-46 was determined by following ASTM D 5526-94 (reapproved 2002), Standard Test Method for Determining Anaerobic Biodegradation of Plastic Materials Under Accelerated Landfill Conditions. Using the standard test, a mixture was prepared comprising 60% by weight of sterilized dehydrated manure (to simulate processed household waste), at different percentages of distilled water (35% or 60%), and 10% fermenting inoculum from an active composter. Film samples of the compostable olefin, vinyl halide, vinyl acetate, and other polymers were run in the Examples which follow. All experiments were run at 97° F. in a dark incubator.

OLEFIN POLYMER EXAMPLES 1-9

Example 1

1.5 grams of Royalene 521 EPDM (Lion Copolymer) were dissolved in 50 grams toluene at 75° C. Royalene 521 is an amorphous terpolymer of approximately 58% ethylene, 38% propylene and 4% ethylidene norbornene (ENB) having a number average molecular weight (Mn) of about 140,000 with Mw/Mn of about 2.9. After cooling to 40° C., the solution was coated on release liner to form a 2 mil film when dry. Two grams of the dried film were placed in 50 grams of a landfill composition per ASTM D5526 containing 35% water; two grams were placed in 50 grams of landfill having 60% water content. After 120 days in the landfill at 35° C., neither sample showed visible change. On removal from the landfill, washing with water and drying, sample weight was unchanged to within 1%.

Parallel experiments were also carried out using Royalene 3275, an amorphous terpolymer containing 58% ethylene, 40% propylene and 2% ENB having Mn of about 190,000 and Mw/Mn of about 2.9. After 120 days, samples showed no visible or weight change.

Example 2

Example 1 was repeated except that each sample contained 0.05 gram of Kenrich Lica 38J, identified above, added while the polymer was in toluene solution, and five samples were run of each variation. After 30 days landfill exposure, all samples with micro landfills having 35% water showed strong mold growth; those at 60% water, slight mold growth.

| Sample | % Water | % Weight change |
|--------|---------|-----------------|
| 521    | 35      | - 12            |
| 3275   | 35      | - 8             |
| 521    | 60      | - 1-2           |
| 3275   | 60      | - 1-2           |

After 60 days, 521 (35%) had lost 27% of starting weight; 3275 (35%) had lost 20%; the samples at 60% water, about 5%.

After 90 days, 521 (35%) had become semisolid. It was removed by extraction with hexane; it had lost about 75% of starting weight and was the consistency of paraffin wax. 3275 (35%) had lost about half its original weight. The samples at 60% water appeared slightly stiffer than the originals, presumably from loss of additives and very low MW fractions. They had lost 8-10% of original weight.

After 120 days, 521 and 3275 at 35% water had vanished. Hexane extraction led to recovery of 2-3% heavy oil. The samples at 60% water were unchanged at losses of 8-10% of original weight. This was also the case after 150 days. The lack of consumption of polymer at 60% water probably indicates hydrolysis of the catalyst.

Example 3

Example 2 was run as above but using Lica 238J, identified above. With Royalene 521, weight losses after 30, 60, 90 and 120 days were 10, 25, 70 and 98%, respectively; with 3275, 10, 22, 68 and 96%, respectively, all in landfills at 35% water. Example 2 was also run with Kenrich NZ 38J, identified above, the zirconate analog of Lica 38J, using Royalene 521 in a landfill with 35% water. Weight losses after 30, 60, 90 and 120 days were 10, 20, 63 and 95%, respectively.

Example 4

Example 2 was run as above but using 0.1 gram Lica 38J in Royalene 521, rather than 0.05 gram. Weight losses after 30, 60 and 90 days in landfills at 35% water were 14, 32 and 78%, respectively. Samples in landfills using 60% water lost 10% after 90 days.

Example 5

Example 2 was run as above using 0.02 gram Lica 38J in Royalene 521 in micro landfills containing 35% water. Weight losses after 30, 60, 90 and 120 days were 7, 15, 38 and 60%, respectively. After 180 days, weight loss was 68%. The unconsumed residue was a waxy solid similar to paraffin. The resistance to decomposition at 60% moisture probably indicates consumption or hydrolysis of the titanium catalyst.

Example 6

Example 4 was run as above except that 0.1 gram Lica 38J was replaced by separate additions of 0.67 gram Lica 38 and 0.33 gram of dimethylaminopropyl methacrylamide (DMP-DMA, Degussa) in Royalene 521 in a landfill containing 35% water. Weight losses after 30, 60 and 90 days were 13, 34 and 80%, respectively, within experimental error of Example 4 results.

Example 7

Example 6 was run as above except for use of dimethylaminoethyl methacrylate (Sartomer) and Lica 38 in Royalene 521 at 35% water. Weight losses after 30, 60 and 90 days were 17, 42 and 86%, respectively. The same experiment using instead p-dimethylaminostyrene (DMAS, Degussa) at molar equivalence yielded 30, 60 and 90 day weight losses of 15, 35 and 78%, respectively. Use instead of dimethylaminopropylamino ferrocene at molar equivalence yielded weight losses almost identical to those found with p-dimethylaminostyrene.

Since none of these dimethylamino-containing monomers appears to have specific attraction to hydrocarbon polymers, it seems likely that the tertiary amine functionality is involved in activation of titanium or zirconium so as to catalyze chain scission under landfill conditions.

Example 8

Example 2 was repeated as above with Royalene 521 except for casting a 1 instead of 2 mil film. Weight loss after 30, 60 and 90 days was 22, 50 and ~100%, respectively, at 35% water content. At 60% water, weight loss was only slightly greater than with 2 mil films.

Example 9

Example 2 was repeated with multiple coats of Royalene 521 to reach a 5 mil thickness. At 35% water content, weight loss after 30, 60, 90 and 120 days was 6, 13, 29 and 52%, respectively.

Examples 2-9 demonstrated the compostabilities of olefin polymer compositions in landfills under anaerobic conditions as evidenced by substantial weight loss of olefin polymer films up to about 100% over relatively short times up to about 120 days.

VINYL HALIDE POLYMER EXAMPLES 10-23

In each of the examples 10-21, as follows, standard resin formula was employed which contained 100 parts by weight polyvinyl chloride homopolymer (Geon 121 PVC by B.F. Goodrich). Included in the standard formula was a plasticizer such as di-octyl adipate (DOA) or di-isodecyl phthalate (DIDP).

The compostability of the PVC compositions of the examples was determined by following ASTM D 5526-94 (reapproved 2002), Standard Test Method for Determining Anaerobic Biodegradation of Plastic Materials Under Accelerated Landfill Conditions. Using the standard test, a mixture was prepared comprising 60% by weight of sterilized dehydrated manure (to simulate processed household waste), 30% distilled water, and 10% fermenting inoculum from an active composter. 50 g were used in sealed Petri dishes with 2 by 1 inch samples of PVC composition or composite sheet material. All experiments were run at 97° F. in a dark incubator.

Example 10

A plastisol was mixed with consisting of 100 parts PVC (Geon 121), 80 parts di-isodecyl phthalate (DIDP), and 2 parts dibutyltin dilaurate (DBTDL) heat stabilizer; coated as a 2 mil film on release paper and fused. Samples were unchanged after 90 days exposure to the test conditions of ASTM D 5526-94. The procedure was repeated using di-octyl adipate (DOA) in place of DIDP. After 90 days, there was visible mold growth on the film but no visible evidence of decomposition. The procedure was repeated with the addition of 2.5 parts of a 4% solution of isothiazolone biocide (MICRO-CHEK 11, Ferro Corporation). In this case, there was no evidence of mold growth after 90 days.

Example 11

The plastisol of Example 10 was mixed using DOA, DBTDL plus 5 parts of titanium neoalkanato, tri(dioctyl) pyrophosphato-O-(adduct)-N-substituted methacrylamide (Kenrich LICA 38J). Fused samples were consumed in the test landfill within 10 days, vanishing to the visible eye. The experiment was repeated adding 2.5 parts of MICRO-CHEK 11 biocide, with identical results.

Example 12

The plastisol of Example 10 was mixed with DBTDL, LICA 38J and, replacing DOA with the di-isononyl ester of cyclohexane dicarboxylic acid (DINCH, BASF). Upon testing per ASTM D 5526-94 method, fused samples disappeared in 7 days, with or without added biocide.

Example 13

Example 12 was repeated with the zirconate analog of LICA 38J (Kenrich NZ 38J). Upon testing per ASTM D 5526-94 method, fused samples disappeared within 10 days.

Example 14

The plastisol was mixed using DINCH, LICA 38J and dibutyltin maleate ester heat stabilizer (PLASTISTAB 2808, Halstab) in place of DBTDL. Upon testing per ASTM D 5526-94 method, fused samples disappeared within 10 days.

Example 15

The plastisol was mixed using DINCH, LICA 38J, and 2 parts of a liquid calcium/zinc stabilizer (PLASTISTAB 3002, Halstab) in place of DBTDL organotin. After 90 days, the fused sample had heavy mold growth and had fragmented but was still visibly of the same dimensions.

Example 16

Control samples were run for comparison. Upon testing per ASTM D 5526-94 method, samples of untreated filter paper showed mold growth within week and were consumed in 30 days. A sample of polylactic acid (PLA) 2 mil film was completely consumed in seven days. A sample of 1 mil low density polyethylene (LDPE) film was unchanged after 90 days.

Example 17

A plastisol was mixed consisting of 100 parts Geon 121 PVC, 80 parts DOA, 2 parts DBTDL stabilizer and 5 parts of LICA 38, which is the titanate LICA 38J without the methacrylamide adduct. After 30 days at 971F per ASTM D 5526, there was no visible sign of decomposition. The same result was found with NZ 38, the zirconate bases for NZ 38J, and with 5 parts of methacrylamide itself. These tests establish that the methacrylamide adduct of the organotitanate or zirconate is necessary for compostability.

Example 18

A plastisol was mixed consisting of 100 parts PVC, 80 parts DOA, 5 parts LICA 38J organotitanate-methacrylamide adduct, and 2 parts of dibutyltin di-isothioglycolate (SP1002, Ferro Corporation). After 30 days, there was only minor decomposition. This probably reflects the antioxidant capability of organotin mercaptides. It also presently establishes the preferred organotin carboxylates in the prodegradant system.

Example 19

Example 18 was repeated using the following stabilization system: epoxidized soybean oil (ESO)—2 parts; phenyl di-iso-decyl phosphite—2 parts; zinc stearate—0.2 parts. After 30 days, there was no visible compostability, probably due to the antioxidant capability of the phosphite that would be used in most mixed metal stabilizer systems. In this case there was, however, notable mold growth, so it is possible that there might be eventual decomposition (period of years). Repetition using ESO containing 4% isothiazolone biocide led to no mold growth.

Example 20

As described previously, plastisol was mixed consisting of 100 parts Geon 121 PVC, 80 parts DOA, 2 parts DBTDL, and 5 parts of Kenrich LICA 38J reactive titanate. To this was added 5 parts of VULCABOND MDX (Akzo Nobel) bonding agent. The plastisol was coated on polyester fabric and fused to a coating of about 5 mils thickness.

A sample of this coated fabric with the inventive prodegradant system and a control sample of a commercial finished product of the same construction (without the prodegradant system) were exposed at 90° F. per ASTM D5526 conditions. After two weeks exposure, the control sample was essentially unchanged. The inventive sample has lost almost all trace of plastisol to the landfill, the only remnants being that which penetrated intersections of the fabric mesh. The fabric shows evidence of some decomposition and it is anticipated that the polyester will slowly decompose.

Example 21

In Examples 10-20, the PVC samples were plasticized with DOA or DIDP in combination with a prodegradant system which was the adduct of K-38 and dimethylaminopropyl methacrylamide (DMPDMA). In order to demonstrate the effectiveness of the monomeric adduct in comparison to each of the adduct components, Examples similar to 10-20 were repeated with each of the adduct components alone. None of the components of the adduct, alone, caused depolymerization of the halogenated polymers. However, if each of the components of the adduct were added separately to the PVC compound, and reacted in situ, the combination was as effective as adding the adduct. Accordingly, it has been presently demonstrated that the monomeric adduct of the organotitanate or zirconate is essential in order to obtain the desired results of the prodegradant system.

As stated above, the theory or mechanism of the advantageous results of the prodegradant system of this invention is not completely understood. However, a possible explanation for the depolymerization of PVC in the landfill is that it seems likely that PVC loses HCl to amines formed in the landfill as their salts. Further, decomposition of PVC at a 2% level into an ASTMD 5526 landfill does not seem to have negative effects on the ability of the landfill to support plant growth. This benign effect is required by ASTMD 6400 Standard Specification for Compostable Plastics. The DMPDMA moiety possibly reacts with conjugated unsaturation that has developed in PVC by a Diels Alder condensation (which is a reversible route leading to the possibility of the additive being catalytic and not being consumed). DMPDMA is an extremely reactive monomer. A consequence is that C—C bonds in the polymer chain are brought into close proximity to a coordination-activated (titanium or zirconium), apparently leading to C—C bond breaking. At 45-60 days, when the prodegradant additive is used or formed in situ, PVC is not readily visible to the unaided eye. Microscopically, one can discern 5-50 micron light flakes that appear to be PVC compound, as well as roughly cubic 2-5 micron calcium carbonate crystals.

Example 22

Examples 10-21 were based upon plasticized halogenated polymer compositions. For the purpose of demonstrating unplasticized halogenated polymer compositions, further examples were performed. The compositions were based on Dow Chemical VYHH, a PVC copolymer containing 14% vinyl acetate, intrinsic viscosity of 0.5 and readily soluble in MEK (insoluble in hexane). The VYHH PVC copolymer does not itself decompose into the landfill, nor does this occur with 2-5 phr of K-38 which is the titanate component of the adduct. However, when samples containing 5, 1, and 0.5 phr K38J adduct, and 2 phr DBTDL stabilizer, depolymerization, or compostability, was observed upon performing the ASTMD 5526 conditions. Accordingly, when using the prodegradant system of K38J, after 60 days at 35° C. in the dark, no visual traces of the PVC compound were observed. Accordingly, these examples demonstrate that unplasticized halogenated polymers will effectively decompose with the prodegradant system of this invention.

Example 23

The procedures of Example 22 were repeated with chlorinated polyethylene (CPE) powder, Dow Tyrin 3615. After 60 days, the CPE compound was in the form of traces of 0.1-1.0 mm grayish powder which were insoluble in hexane.

VINYL ACETATE POLYMER EXAMPLES 24-30

The compostability of the PVAc compositions of the examples was determined by following ASTM D 5526-94 (reapproved 2002), Standard Test Method for Determining Anaerobic Biodegradation of Plastic Materials Under Accelerated Landfill Conditions. Using the standard test, a mixture was prepared comprising 60% by weight of sterilized dehydrated manure (to simulate processed household waste), at different percentages of distilled water (35% or 60%), and 10% fermenting inoculum from an active composter. Film samples of the compostable PVAc polymers were run in the Examples which follow. All experiments were run at 97° F. in a dark incubator.

Example 24

1.5 grams of Poval (Kuraray) LM-20, a partially hydrolyzed polyvinyl acetate, having a number average molecular weight (Mn) of about 20,000 were dissolved in 50 grams of ethanol. The solution was coated on release liner to form a two-mil film when dry. Two grams of the dried film were placed in 50 grams of landfill composition per ASTM D 5526 containing 35% water; two grams were also placed in 50 grams of landfill composition having 60% water content. After ninety days at 35% moisture, the film was intact with a weight gain of about 6%. After ninety days at 60% moisture, the film appeared softened, and had gained about 10% in weight. There was no evidence of microbial growth. The cast film was clear and accepted pencil and ballpoint. It adhered strongly to 3M #142 pressure-sensitive tape.

Example 25

Example 24 was repeated, except each sample contained 0.05 gram of Kenrich LICA 38J, identified above, added while the polymer was in ethanol solution, and five samples were run of each variation of moisture levels. After 30 days' landfill exposure, at both moisture levels of 35% or 60% water, the polymer of all samples with the microlandfills, vanished into the landfill.

Example 26

Example 25 was repeated with a 1:1 blend of ethylene vinyl acetate (ELVAX 40 EVA) and a partially hydrolyzed polyvinyl acetate (Polyal LM-20 PVAc). Both moisture level samples vanished in 30 days. The cast film was clear and accepted pencil and ballpoint ink without difficulty. 3M #142 transparent tape had strong adhesion to the film. A sample exposed to UV-A light at 40° C. for 30 days showed no visible discoloration. The sample burned readily when ignited with a match, and did not self-extinguish.

Example 27

Example 24 was repeated with UCAR VYHH (Dow) PVC/VAC, which is a copolymer of polyvinyl chloride and vinyl acetate at 14% vinyl acetate, with a number average molecular weight (Mn) of about 10,000. Two films were cast from methylisobutylketone with two parts per hundred of dibutyltin dilaurate (DBTDL) heat stabilizer added. This Example demonstrates that when the vinyl copolymer of vinyl acetate with vinyl chloride is employed, stabilizer is added. The samples were translucent, accepted pencil and ballpoint ink, and had strong adhesion to 3M #142 tape. The samples showed no measurable weight loss after 90 days' exposure, either at a 35% or 60% moisture level, nor evidence of surface mold growth.

Example 28

Example 27 was run with the addition of 2 phr of LICA 38J at 35% water, weight loss after 30 and 60 days was 65% and 96%, respectively. At 60% water, weight loss after 30, 60, and 90 days was 12%, 20%, and 27%, respectively. This Example demonstrated, at various moisture levels, landfill compostability of the composition. This Example 28 may be compared to Example 13 in the earlier application Ser. No. 11/747,481, filed May 11, 2007, for the purpose of demonstrating unplasticized PVC/VAC polymer compositions. The VYHH PVC copolymer with 14% vinyl acetate was employed in that Example 13. As reported in that Example 13, the VYHH PVC/VAC copolymer with vinyl acetate does not itself decompose into the landfill, nor does this occur with 2-5 phr of K-38, which is the titanate component of the adduct. However, samples containing the prodegradant system of 5,1, and 0.5 phr K38J adduct and 2 phr DBTL organotin depolymerization or compostability was observed upon performing the ASTMD 5526 conditions. Accordingly, when using the prodegradant system of K38J and organotin, after 60 days at 35° C. in the dark, no visual traces of the PVC/VAC copolymer were observed. These Examples 28 (in this application) and Example 13 of the patent application Ser. No. 11/747,481, demonstrate that unplasticized halogenated copolymers with vinyl acetate will effectively decompose with the prodegradant of this invention.

Example 29

Example 28 was run using the 1:1 of UCAR VYHH PVC/VAC and Poval LM-20 PVAc, identified as above. At both moisture levels of 65% and 96%, the polymer had vanished into the landfill in 30 days. The 2 ml cast film was transparent, readily accepted pencil and ballpoint marking, and adhered strongly to 3M #142 tape. The sample exposed to UV-A radiation at 40° C. for 30 days (Q-panel) showed no discoloration. The sample, when ignited with a match, self-extinguished.

Example 30

Example 28 was run using a blend of UCAR VYHH PVC/VAC and ELVAX-40, previously identified, at both 35 and 60 percent moisture levels, weight loss after 30 days was 45-50%, and 100% after sixty days. Accordingly, these Examples further illustrate the compostability of vinyl acetate copolymers according to the principles of this invention.

EXAMPLES 31-35

The purpose for these following Examples 31-35 is to demonstrate the effectiveness of sulfonate and nitrate analogs of the phosphate ligand in the above-identified prodegradant compounds. The hydrophobic hydrocarbon base polymer consisted of 100 parts PVC (Geon 121), 45 parts di-iso-nonyl adipate (DINA), 20 parts calcium carbonate, 6 parts titanium dioxide, 2.5 parts epoxidized soybean oil (ESO), and 2 parts of dimethyltin maleate. To the base hydrocarbon polymer composition was added 2 phr of LICA (KR) 38J and 2 phr of KR 238J, identified above, which served as Examples 31 and 32. Example 33 employed Kenrich 262J, which is the same compound as LICA 238J, but sidechains on the phosphorus are methyl and butyl instead of octyl. In other words, KR 262J is titanium IV bis (butyl, methyl)-pyrophosphato-O ethylenediolato (adduct) with DMAPMA. As used herein "DMAPMA" means N-substituted methacrylamide, above identified. Kenrich 262ESJ is the monomeric adduct of titanium IV bis(butyl, methyl)pyrophosphato-O ethylenediolato (adducts) bis(dioctyl)hydrogen phosphite and DMAPMA. For comparison with Examples 31-33, sulfate and nitrate analogs of the phosphate ligand of the prodegradants LICA 38J, 238J, and 262J were employed. In the case of Example 34, the sulfonate analog employed was titanium IV bis-2-propenolato-butanolato-tris-dodecylbenzenesulfonate (adduct) DMAPMA. In the case of Example 35, the nitrate analog was Kenrich 134J, which is the titanium IV bisphenylpropyl-phenolato-oxoethylenediolato (adducts) sorbitol nitrate and DMAPMA. The nitrate adduct was 1:1 DMAPMA adduct of the reaction product of 1:1 molar sorbitol nitrate and KR 134J. KR134J=titanium IV bis[4-(2 phenyl) 2-propyl-2]phenolato oxyethylenediolato.

All of the above polymer compositions containing the prodegradant adducts having the phosphate, sulfate, and nitrate ligands were coated on release paper using a wire-bound bar infused at 150° C. to yield 2-3 mil coatings. 2 grams of each were placed on 50 grams of landfills medium per ASTM D5526. (21.5 grams sterilized sewage=milorganite, 7.5 grams of active compost, 21 grams of water, pH after 24 hours=7.8, $CO_2$ and $NH_3$ levels OK per the Solvita compost maturity spot test procedure). These were in crystal styrene petri dishes maintained at 35° C. in a dark incubator after being sealed. After 90 days, all of the above had vanished into the landfill except for a scatter of filter and pigment particles.

EXAMPLES 36-46

In each of the Examples 36-43, as follows, 5 grams of expanded polystyrene samples were dissolved in 25 ml MEK at room temperature and 50 mg of the prodegradant were added. The solution was allowed to evaporate in an aluminum pan. 2 grams were removed for addition to 50 grams of ASTM D5526 landfill. In the following Examples, as in Examples 31-35, the Kenrich 09J and 134J prodegradants were employed. In the case of Example 36, an adduct of K38S with dimethylaminopropyl styrene was employed, i.e., titanium IV 2-propenolato tris (dioctyl)pyrophosphato-O(adduct) dimethylaminopropyl styrene in 1:1 molar ratio.

In Example 37, the composition was the same as the control of Example 36 but with Kenrich 38J. In the case of Example 38, the composition was the same, but with Kenrich 09J sulfonate analog. In the case of Example 39, the composition was the same, but with Kenrich 134J, the nitrate analog. In the case of Example 40, Ivex Packaging Corp. expanded polystyrene "4D food tray" was employed with Kenrich 38J. In the case of Example 41, Dart Industries expanded polystyrene drinking cup was employed with Kenrich 38J. In the case Example 42, Joy Sports & Leisure (China) expanded polystyrene was employed with Kenrich 38J. In the case of Example 43, the Joy Sports & Leisure (China) expanded polystyrene was employed with Kenrich 262ESJ. In the cases of Examples 44-46, solid styrene acrylonitrile polymer (KUMHO SAN300) and acrylonitrile butadiene styrene polymer (BASF Terluran ABSGP-22) were employed with the prodegradants. In the case of Examples 44 and 45, Kenrich 38J was employed as a prodegradant. In the case of Example 46, Kenrich 262ESJ was employed as the prodegradant.

After 30 days in the ASTM D5526 landfill, the four expanded polystyrene samples had vanished. There was no residue visible at 10x. After 60 days, the four solid polystyrene samples had vanished. After 60 days, the solid ABS and SAN samples had vanished. Control samples without the organotitanate prodegradant additives appeared unchanged. Neither Kenrich 38J nor Kenrich 262ESJ appeared to decrease the clarity of the polystyrene or SAN at the level used before landfill exposure. In the landfill, all samples containing titanates became opaque.

EXAMPLES 47-50

Example 47

10 grams LDPE pellets (density 0.91, Shore D 39) and 110 mg of Kenrich KR38J titanate were added to 50 ml technical grade hexane for 6 hours in a rotating jar mill at 25-30° C. under an incandescent lamp. The solvent was decanted, the pellets allowed to dry at room temperature and 2.5 grams added to 50 grams ASTM D5526 simulated landfill medium. After 30 days, the surface of the pellets had been colonized by microbes that generated a yellow coloration. After 6 months, a circular spot of powder was found where each pellet had been. The spot yielded a brown color with sodium nitrite solution, suggesting a phenolic antioxidant.

Example 48

Example 47 was repeated using polypropylene pellets (density 0.90, Shore D 62). After 30 days, there was heavy bacterial growth, and visible loss of mass. After 90 days, the pellets had fragmented and were encapsulated in bacterial colonies.

Example 49

Example 47 was repeated using Dow Engage 8402 ethylene/octene copolymer (density 0.90, Shore D 44). The sample began to lose mass after 15 days. After 60 days small fragments of polymer remained beneath bacterial growth. These had vanished in 6 months.

Example 50

Example 47 was repeated using LLDPE (density 0.92, Shore D 48) tubing. Bacterial attack, noticeable after 30 days, covered the sample, which fragmented and vanished into the landfill in 120 days.

Those of ordinary skill in the art realize that the descriptions, procedures, methods and compositions presented above can be revised or modified without deviating from the scope of the described embodiments, and such do not depart from the scope of the invention.

What is claimed is:
1. An anaerobically compostable hydrocarbon polymer composition comprising
    a hydrocarbon polymer selected from the group consisting of a vinyl halide polymer, vinyl acetate polymer, and an olefin polymer, and copolymers or blends thereof, and
    a monomeric adduct of an organotitanate or an organozirconate as a prodegradant in relative amounts to render the polymer composition anaerobically compostable under ASTM D-5526-94 conditions, and wherein said adduct is defined by the formula

ORGANOTITANATE OR ZIRCONATE —X-SALT FORMING GROUP-R—C=C-ACTIVATING GROUP, where X is a phosphate, nitrate or sulfonate group, R is a hydrocarbon radical or substituted hydrocarbon radical and activating group has a C=O, —CN, oxygen, nitrogen, sulfur, or an aromatic ring conjugated with the C=C to activate the carbon-carbon double bond, wherein the substituent of the substituted hydrocarbon radical is selected from the group consisting of an ether, thioether, ester, thioester, and amide
    wherein the monomeric adduct is an adduct of a monomer selected from the group consisting of
    ethyl dimethvlaminoethylmethacrylate,
    methyl dimethlaminopropyl acrylate,
    2-morpholine-N-ethyl acrylamide,
    2-piperidinyl-N-ethyl acrylonitrile,
    2-dimethylaminoethyl acrolein,
    dimethylaminoethyl vinyl ether,
    dimethylaminoethyl vinyl thioether,
    4-dimethylaminomethyl styrene,
    allyl 3-dimethylamino propionate,
    methallyl 3-dimethylamino propionate, thioallyl 3-dimethylamino propionate,
dimethylaminomethyl acrylate, and
dimethylaminomethylacrylamide.

2. The composition of claim 1, wherein said polymer is selected from the group consisting of polyethylene, polypropylene, polystyrene, ethylene-propylene-diene (EPDM) polymer, polyvinyl acetate, partially hydrolyzed polyvinyl acetate, poly(vinylacetate-vinylchloride), poly(ethylenevinylacetate), and polyvinyl chloride, and copolymers or blends thereof.

3. The composition of claim 1 wherein the prodegradant is contained in an amount of from about 1 to about 10 phr polymer.

4. An anaerobically compostable hydrocarbon polymer composition comprising:
   a hydrocarbon polymer selected from the group consisting of a vinyl halide polymer, vinyl acetate polymer, and an olefin polymer, and copolymers or blends thereof, and
   a monomeric adduct of an organotitanate or an organozirconate as a prodegradant in relative amounts to render the polymer composition anaerobically compostable,
   wherein said organotitanate or organozirconate is an amide or ester adduct of neoalkoxy modified monoalkoxy titanate or zirconate having a phosphate, nitrate, or sulfonate group.

5. An anaerobically compostable hydrocarbon polymer composition comprising:
   a hydrocarbon polymer selected from the group consisting of a vinyl halide polymer, vinyl acetate polymer, and an olefin polymer, and copolymers or blends thereof, and
   a monomeric adduct of an organotitanate or an organozirconate as a prodegradant in relative amounts to render the polymer composition anaerobically compostable,
   wherein the monomeric adduct is selected from the group consisting of titanium IV neoalkanolato tri(dioctyl) pyrophosphato-O (adduct) N-substituted methacrylamide, titanium IV neoalkanolato bis(dioctyl) pyrophosphato-O (adduct) N,N-dimethylamino-alkyl propenamide, zirconium IV neoalkanolato tri(dioctyl) pyrophosphato-O (adduct) N-substituted methacrylamide, zirconium IV neoalkanolato bis(dioctyl) pyrophosphato-O (adduct) N,N-dimethylamino-alkyl propenamide, titanium IV bisphenylpropyl-phenolato-oxoethylenediolato (adducts) bis (dioctyl) hydrogen phosphite and N-substituted methacrylamide, titanium IV bis (butyl methyl)-pyrophosphato-ethylenediolato (adduct) bis(dioctyl) hydrogen phosphite and N-substituted methacrylamide titanium IV 2-propenolato tris (dioctyl) pyrophosphato-O (adduct) dimethylaminopropyl styrene, titanium IV bis-2-propenolato-butanolato-tris-dodecylbenzesulfonate (adduct) N-substituted methacrylamide.

6. The composition of claim 1 wherein the polymer is derived from a monomer selected from the group consisting of ethylene, propylene, butene, hexene, octene, a diene, styrene, vinyl acetate, vinyl chloride, and acrylonitrile, and copolymers or terpolymers thereof.

7. The composition of claim 1 wherein X is phosphate.

8. An anaerobically compostable hydrocarbon polymer composition comprising:
   a hydrocarbon polymer selected from the group consisting of polyethylene, polypropylene, polystyrene, ethylene-propylene-diene (EPDM) polymer, polyvinyl acetate, partially hydrolyzed polyvinyl acetate, poly(vinylacetate-vinylchloride), poly(ethylenevinylacetate), and polyvinyl chloride, and copolymers or blends thereof, and
   a monomeric adduct of an organotitanate or an organozirconate as a prodegradant in relative amounts to render the polymer composition anaerobically compostable, and
   wherein the monomeric adduct is selected from the group consisting of titanium IV neoalkanolate tri(dioctyl) pyrophosphato-O (adduct) N-substituted methacrylamide, titanium IV neoalkanolato bis(dioctyl) pyrophosphato-O (adduct) N,N-dimethylamino-alkyl propenamide, zirconium IV neoalkanolate tri(dioctyl) pyrophosphato-O (adduct) N-substituted methacrylamide, zirconium IV neoalkolato bis(dioctyl) pyrophosphato-O (adduct) N,N-dimethylamino-alkyl propenamide, titanium IV bisphenylpropyl-phenolato-oxoethylenediolato (adducts) bis (dioctyl) hydrogen phosphite and N-substituted methacrylamide, titanium IV bis (butyl methyl)-pyrophosphato-ethylenediolato (adduct) bis(dioctyl) hydrogen phosphite and N-substituted methacrylamide, titanium IV 2-propenolato tris (dioctyl) pyrophosphato-O (adduct) dimethylaminopropyl styrene, titanium IV bis-2-propenolato-butanolato-tris-dodecylbenzesulfonate (adduct) N-substituted methacrylamide.

9. An article in the form of a sheet for use in indoor or outdoor signs, billboards, banners, images, protective barriers, backdrops, and wall coverings formed from an anaerobically compostable hydrocarbon polymer composition comprising
   a hydrocarbon polymer selected from the group consisting of a vinyl halide polymer, vinyl acetate polymer, and an olefin polymer, and copolymers or blends thereof, and
   a monomeric adduct of an organotitanate or an organozirconate as a prodegradant in relative amounts to render the polymer composition anaerobically compostable under ASTM D-5526-94 conditions, and wherein said adduct is defined by the formula

ORGANOTITANATE OR ZIRCONATE —X-SALT FORMING GROUP-R—C$=$C-ACTIVATING GROUP, where X is a phosphate, nitrate or sulfonate group, R is a hydrocarbon radical or substituted hydrocarbon radical and activating group has a C$=$O, —CN, oxygen, nitrogen, sulfur, or an aromatic ring conjuqated with the C$=$C to activate the carbon-carbon double bond, wherein the substituent of the substituted hydrocarbon radical is selected from the group consisting of an ether, thioether, ester, thioester, and amide.

10. The article of claim 9 having a compostable woven or nonwoven fabric layer bonded to said composition.

11. The article of claim 10 wherein said woven or nonwoven fabric is a compostable fabric of a polymer selected from the group consisting of polylactic acid (PLA), polyvinyl alcohol (PVA), polycaprolactone (PCL), polyamide, polyacrylamide, polyacrylate, polymethacrylate, polyester, and cellulose, and copolymers or blends thereof.

12. The article of claim 9 wherein said hydrocarbon polymer is selected from the group consisting of polyethylene, polypropylene, polystyrene, ethylene-propylene-diene (EPDM) polymer, polyvinyl acetate, partially hydrolyzed polyvinyl acetate, poly(vinylacetate-vinylchloride), poly (ethylenevinylacetate), and polyvinyl chloride, and copolymers or blends thereof.

13. An anaerobically compostable polymeric composite article comprising
   an article having an hydrophobic hydrocarbon polymer surface layer, said hydrocarbon polymer selected from the group consisting of a vinyl halide polymer, vinyl acetate polymer, and an olefin polymer, and copolymers or blends thereof, and biodegradable polymer layer underlying said surface layer said surface layer containing a monomeric adduct of an organotitanate or an organozirconate as a prodegradant in relative amounts to render the surface layer anaerobically compostable under ASTM D-5526-94 conditions, thereby enhancing degradation of said article, and wherein said adduct is defined by the formula

ORGANOTITANATE OR ZIRCONATE —X-SALT FORMING GROUP-R—C=C=ACTIVATING GROUP where X is a phosphate, nitrate or sulfonate group, where R is a hydrocarbon radical or substituted hydrocarbon radical and activating group has a C=O, —CN, oxygen, nitrogen, sulfur, or an aromatic ring conjugated with the C=C to activate the carbon-carbon double bond, wherein the substituent of the substituted hydrocarbon radical is selected from the group consisting of an ether, thioether, ester, thioester, and amide.

14. The article of claim 13 wherein said biodegradable polymer is selected from the group consisting of polylactic acid (PLA), polyvinyl alcohol (PVA), polycaprolactone (PCL), polyamide, polyacrylamide, polyacrylate, polymethacrylate, polyester, and cellulose, and copolymers or blends thereof.

15. The article of claim 13 wherein the prodegradant is contained in an amount from about 1 to about 10 phr polymer.

16. The article of claim 13 wherein the monomeric adduct is an amide adduct or an ester adduct.

17. The article of claim 13 wherein said adduct is an organopyrophosphato adduct of a monomer selected from the group consisting of methacrylamide, N-substituted methacrylamide, methacrylate and N-substituted methacrylate.

18. An anaerobically compostable polymeric composite article comprising:

an article having a hydrophobic hydrocarbon polymer surface layer, said hydrocarbon polymer selected from the group consisting of a vinyl halide polymer, vinyl acetate polymer, and an olefin polymer or copolymers or blends thereof, and a biodegradable polymer layer underlying said surface layer, said surface layer containing a monomeric adduct of an organotitanate or organozirconate as a prodegradant in relative amounts to render the surface layer anaerobically compostable, thereby enhancing the degradation of said article, and wherein said organotitanate or organozirconate is an amide or ester adduct of neoalkoxy modified monoalkoxy titanate or zirconate having a phosphate, nitrate, or sulfonate group.

19. An anaerobically compostable polymeric composite article comprising:

an article having a hydrophobic hydrocarbon polymer surface layer, said hydrocarbon polymer selected from the group consisting of a vinyl halide polymer, vinyl acetate polymer, and an olefin polymer or copolymers or blends thereof, and a biodegradable polymer layer underlying said surface layer, said surface layer containing a monomeric adduct of an organotitanate or organozirconate as a prodegradant in relative amounts to render the surface layer anaerobically compostable, thereby enhancing the degradation of said article, and wherein the monomeric adduct is selected from the group consisting of titanium IV neoalkanolato tri(dioctyl) pyrophosphato-O (adduct) N-substituted methacrylamide, titanium IV neoalkanolato bis(dioctyl) pyrophosphato-O (adduct) N,N-dimethylamino-alkyl propenamide, zirconium IV neoalkanolato tri(dioctyl) pyrophosphato-O (adduct) N-substituted methacrylamide, zirconium IV neoalkanolato bis(dioctyl) pyrophosphato-O (adduct) N,N-dimethylamino-alkyl propenamide, titanium IV bisphenylpropyl-penolato-oxoethylenediolato (adducts) bis (dioctyl) hydrogen phosphite and N-substituted methacrylamide, titanium IV bis (butyl methyl)-pyrophosphato-ethylenediolato (adduct) bis(dioctyl) hydrogen phosphite and N-substituted methacrylamide, titanium IV 2-propenolato tris (dioctyl) pyrophosphato-O (adduct) dimethylaminopropyl styrene, titanium IV bis-2-propenolato-butanolato-tris-dodecylbenzesulfonate (adduct) N-substituted methacrylamide.

20. The article of claim 13 wherein the hydrophobic hydrocarbon the polymer is derived from a monomer selected from the group consisting of ethylene, propylene, butene, hexene, octene, a diene, styrene, vinyl acetate, vinyl chloride, and acrylonitrile, and copolymers or terpolymers thereof.

21. The article of claim 13 wherein X is phosphate.

22. The article of claim 13 in the form of a sheet, having bonded thereto a compostable woven or nonwoven fabric layer.

23. The article of claim 20 wherein said woven or nonwoven fabric is a compostable fabric of a polymer selected from the group consisting of polylactic acid (PLA), polyvinyl alcohol (PVA), polycaprolactone (PCL), polyamide, polyacrylamide, polyacrylate, polymethacrylate, polyester, and cellulose, and copolymers or blends thereof.

24. The article of claim 23 wherein said article polymer surface layer contains a polymer selected from the group consisting of polyethylene, polypropylene, polystyrene, ethylene-propylene-diene (EPDM) polymer, polyvinyl acetate, partially hydrolyzed polyvinyl acetate, poly(vinylacetate-vinylchloride), poly(ethylenevinylacetate), and polyvinyl chloride, and copolymers or blends thereof.

25. The article of claim 18, 19, or 22 in the form of a sheet for use in indoor or outdoor signs, billboards, banners, images, protective barriers, backdrops, and wall coverings.

26. A method of anaerobic biodegradation of a compostable polymeric article in a landfill comprising introducing an article or a physically reduced form thereof into a landfill for anaerobic degradation, said article having an hydrophobic hydrocarbon polymer surface layer selected from the group consisting of a vinyl halide polymer, vinyl acetate polymer, and an olefin polymer, and copolymers or blends thereof, and containing a monomeric adduct of an organotitanate or an organozirconate as a prodegradant in relative amounts to render the surface layer anaerobically compostable under ASTM D-5526-94 conditions, and wherein said adduct is defined by the formula

ORGANOTITANATE OR ZIRCONATE —X-SALT FORMING GROUP-R—C=C-ACTIVATING GROUP where X is a phosphate, nitrate or sulfonate group, R is a hydrocarbon radical or substituted hydrocarbon radical and activating group has a C=O, —CN, oxygen, nitrogen, sulfur, or an aromatic ring conjugated with the C=C to activate the carbon-carbon double bond, wherein the substituent of the substituted hydrocarbon radical is selected from the group consisting of an ether, thioether, ester, thioester, and amide, and anaerobically degrading said article surface layer in the landfill, thereby enhancing degradation of said article.

27. The method of claim 26 wherein said article has a biodegradable polymer layer underlying said surface layer, wherein said biodegradable polymer is selected from the group consisting of polylactic acid (PLA), polyvinyl alcohol (PVA), polycaprolactone (PCL), polyamide, polyacrylamide, polyacrylate, polymethacrylate, polyester, and cellulose, and copolymers or blends thereof.

28. A method of anaerobic biodegradation of a compostable polymeric article in a landfill, comprising
introducing an article or a physically reduced form thereof into a landfill for anaerobic degradation,
said article having an hydrophobic hydrocarbon polymer surface layer selected from the group consisting of a vinyl halide polymer, vinyl acetate polymer, and an olefin polymer, and copolymers or blends thereof, and containing a monomeric adduct of an organotitanate or an organozirconate as a prodegradant in relative amounts to render the surface layer anaerobically compostable, and
wherein the monomeric adduct is selected from the group consisting of titanium IV neoalkanolato tri(dioctyl) pyrophosphato-O (adduct) N-substituted methacrylamide, titanium IV neoalkanolato bis(dioctyl) pyrophosphato-O (adduct) N,N-dimethylamino-alkyl propenamide, zirconium IV neoalkanolato tri(dioctyl) pyrophosphato-O (adduct) N-substituted methacrylamide, zirconium IV neoalkanolato bis(dioctyl) pyrophosphato-O (adduct) N,N-dimethylamino-alkyl propenamide, titanium IV bisphenylpropyl-phenolato-oxoethylenediolato (adducts) bis (dioctyl) hydrogen phosphite and N-substituted methacrylamide, titanium IV bis (butyl methyl)-pyrophosphato-ethylenediolato (adducts) bis(dioctyl) hydrogen phosphite and N-substituted methacrylamide, titanium IV bis (butyl methyl)-pyrophosphato -ethylenediolato (adduct) bis(dioctyl) hydrogen phosphite and N-substituted methacrylamide, titanium IV 2-propenolato tris(dioctyl) pyrophosphato-O (adduct) dimethylaminopropyl styrene, titanium IV bis-2-propenolato-butanolato-tris-dodecylbenzesulfonate (adduct) N-substituted methacrylamide, and,
anaerobically degrading said article surface layer in the landfill, thereby enhancing degradation of said article.

29. The method of claim 26 wherein the hydrophobic polymer surface layer is derived from a monomer selected from the group consisting of ethylene, propylene, butene, hexene, octene, a diene, styrene, vinyl acetate, vinyl chloride, and acrylonitrile, and copolymers or terpolymers thereof.

30. The method of claim 26 wherein the adduct is an organopyrophosphato adduct of a monomer selected from the group consisting of methacrylamide, N-substituted methacrylamide, methacrylate and N-substituted methacrylate.

* * * * *